United States Patent
Hsu et al.

(10) Patent No.: US 9,173,063 B2
(45) Date of Patent: Oct. 27, 2015

(54) WIRELESS COMMUNICATION LOCATING METHOD

(71) Applicant: NATIONAL CHUNG SHAN INSTITUTE OF SCIENCE AND TECHNOLOGY, Taoyuan (TW)

(72) Inventors: Tung-Jung Hsu, Taoyuan (TW); Yu-San Lin, Taoyuan (TW); Tain-Wen Suen, Taoyuan (TW); Jen-Chi Liao, New Taipei (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 40 days.

(21) Appl. No.: 14/074,900

(22) Filed: Nov. 8, 2013

(65) Prior Publication Data
US 2015/0133074 A1    May 14, 2015

(51) Int. Cl.
*H04M 11/04*    (2006.01)
*H04W 4/02*    (2009.01)
*H04W 4/22*    (2009.01)

(52) U.S. Cl.
CPC ............... *H04W 4/023* (2013.01); *H04W 4/22* (2013.01)

(58) Field of Classification Search
CPC ........................... H04W 64/00; H04W 76/007
USPC .............. 455/41.2, 556.1, 456.5, 404.2, 518, 455/63.4, 404.1, 457; 342/451, 457
See application file for complete search history.

(56) References Cited

U.S. PATENT DOCUMENTS

| | | | |
|---|---|---|---|
| 2004/0038687 A1* | 2/2004 | Nelson | 455/456.1 |
| 2006/0276205 A1* | 12/2006 | Bengtsson | 455/457 |
| 2008/0070546 A1* | 3/2008 | Lee | 455/404.2 |

* cited by examiner

*Primary Examiner* — Kiet Doan
(74) *Attorney, Agent, or Firm* — Anova Law Group, PLLC

(57) ABSTRACT

The present invention relates to a wireless communication locating method, the method uses a first wireless receiver, a second wireless receiver and a third wireless receiver (i.e., a first rescuer, a second and a third rescuer) to receive mayday and RSSI signals outputted by a person to be rescued, therefore the position of the person to be rescued can be precisely located after a backend signal-processing platform processes and calculates the mayday and RSSI signals. Through the method, each of rescuers are able to output a prompting signal to the person to be rescued by way of frequency synchronization, so as to give the person to be rescued hopes and a message that rescuers are coming. The method also includes the advantages of high damage resistance ability, high expansibility and can be easily operated, such that the purpose of immediate rescue can be achieved by using the method.

10 Claims, 8 Drawing Sheets

$T=T_1$ $T=T_2$

WIRELESS COMMUNICATION LOCATING METHOD

BACKGROUND OF THE INVENTION

1. Field of the Invention

The present invention relates to a locating method, and more particularly, to a wireless communication locating method integrating with a variety of wireless communication technologies and a backend signal-processing platform.

2. Description of the Prior Art

With the change of times, the application of the locating technology is gradually changed from military to nongovernment, and that makes revolutionary changes and many conveniences to people's lives.

For instant, divers can get a recommendatory route through navigators when they are driving cars. Besides, the famously latest smart phone can also provide a navigating and a locating service to drives for avoiding the drivers from losing their way. Moreover, users can find their smart phones through the locating service when their smart phones are got lost.

Inheriting to above descriptions, conventional locating technologies can be generally divided into Global Navigation Satellite System, GNSS, GPS of America, GLONASS of Russia, and cell site locating system. GNSS is a locating system for precisely locating any objects on the earth by using the satellites distributed into space. In spite of including high locating accuracy, the substantial constructing cost of GNSS locating system results from its highly technical operation.

Cell site locating system uses a RSSI (Received Signal Strength Indication) signal received by a signal-receiving terminal to determine the distance between the signal-receiving terminal and the mobile phone, so as to execute an inter-cross calculation after referring to the position database of the cell sites, and then to locate the position of mobile phone owner.

However, the cell tower locating system can merely execute location works in the signal-covering range of the cell sites; for this reason, it is able to know that the locating accuracy of the cell site locating system would easily be influenced by the factors of weather, topography and environment.

Accordingly, in view of the conventional locating technologies still having shortcomings and drawbacks, the inventor of the present application has made great efforts to make inventive research thereon and eventually provided a wireless communication locating method.

SUMMARY OF THE INVENTION

The primary objective of the present invention is to provide a wireless communication locating method, in which, by using a first wireless receiver, a second wireless receiver and a third wireless receiver (i.e., a first rescuer, a second and a third rescuer) to receive mayday and RSSI signals sent out by the person to be rescued, the position of a person to be rescued can be precisely located after a backend signal-processing platform processes and calculates the mayday and RSSI signals. Moreover, through the method proposed by the present invention, each of rescuers is able to output a prompting signal to the person to be rescued by way of frequency synchronization, so as to give the person to be rescued hopes and a message that rescuers are coming Besides, the method of the present invention includes the advantages of high damage resistance ability, high expansibility and can be easily operated because the system framework of the method is very simple, such that the purpose of immediate rescue can be achieved by using the method of the present invention in case of emergency or under precipitous circumstance.

Accordingly, to achieve the primary objective of the present invention, the inventor of the present invention provides a wireless communication locating method, comprising a plurality of steps of:

(1) outputting a mayday signal by a signal-outputting terminal through at least one wireless transmission module, wherein the signal-outputting terminal locates at a specific position in a free space;

(2) receiving the mayday signal by a first wireless receiver at a first position, a second wireless receiver at a second position, and a third wireless receiver at a third position;

(3) the first wireless receiver, the second wireless receiver, and the third wireless receiver delivering a received signal strength indication (RSSI) signal of the mayday signal to a signal-processing platform; and (4) the signal-processing platform analyzing the RSSI signal and GPS positions of the three wireless receivers, so as to calculate an absolute position of the signal-outputting terminal.

BRIEF DESCRIPTION OF THE DRAWINGS

The invention as well as a preferred mode of uses and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a wireless communication method according to the present invention, embodiments of the present invention will be described in detail with reference to the attached drawings hereinafter.

Figure 1:
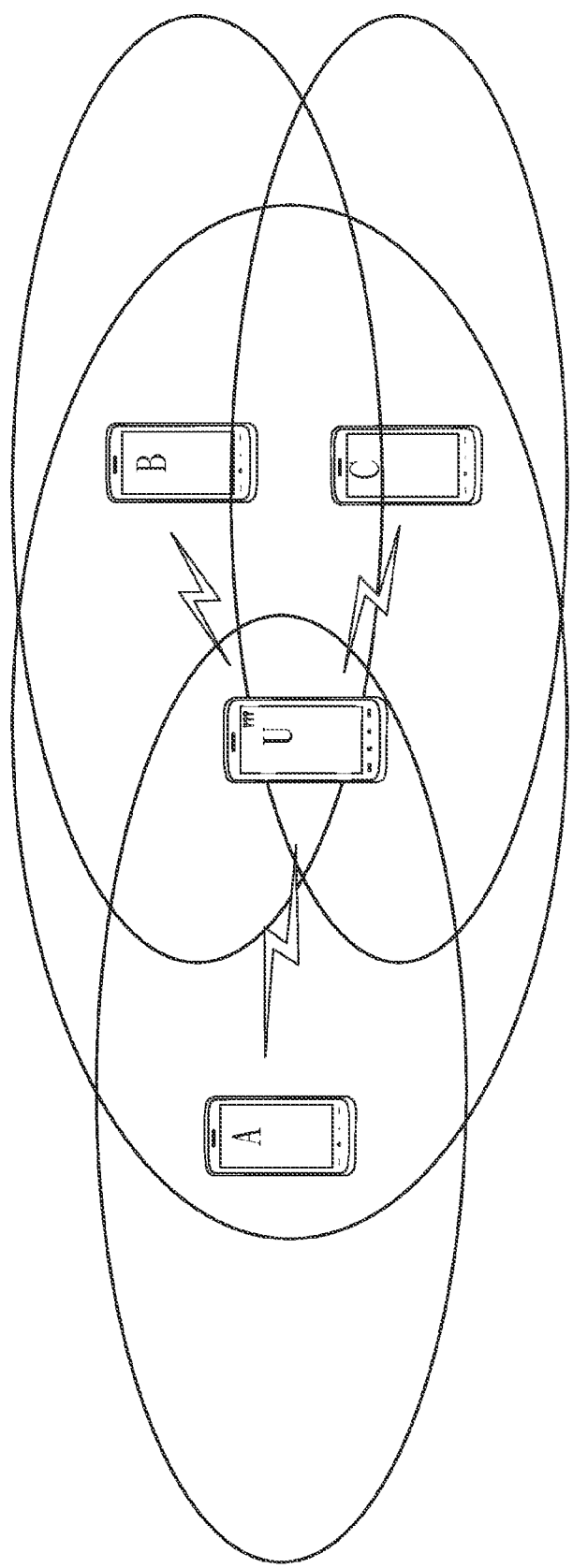
FIG. 1 is a framework view of a wireless communication locating system applied with a wireless communication locating method according to the present invention.
Figure 2:
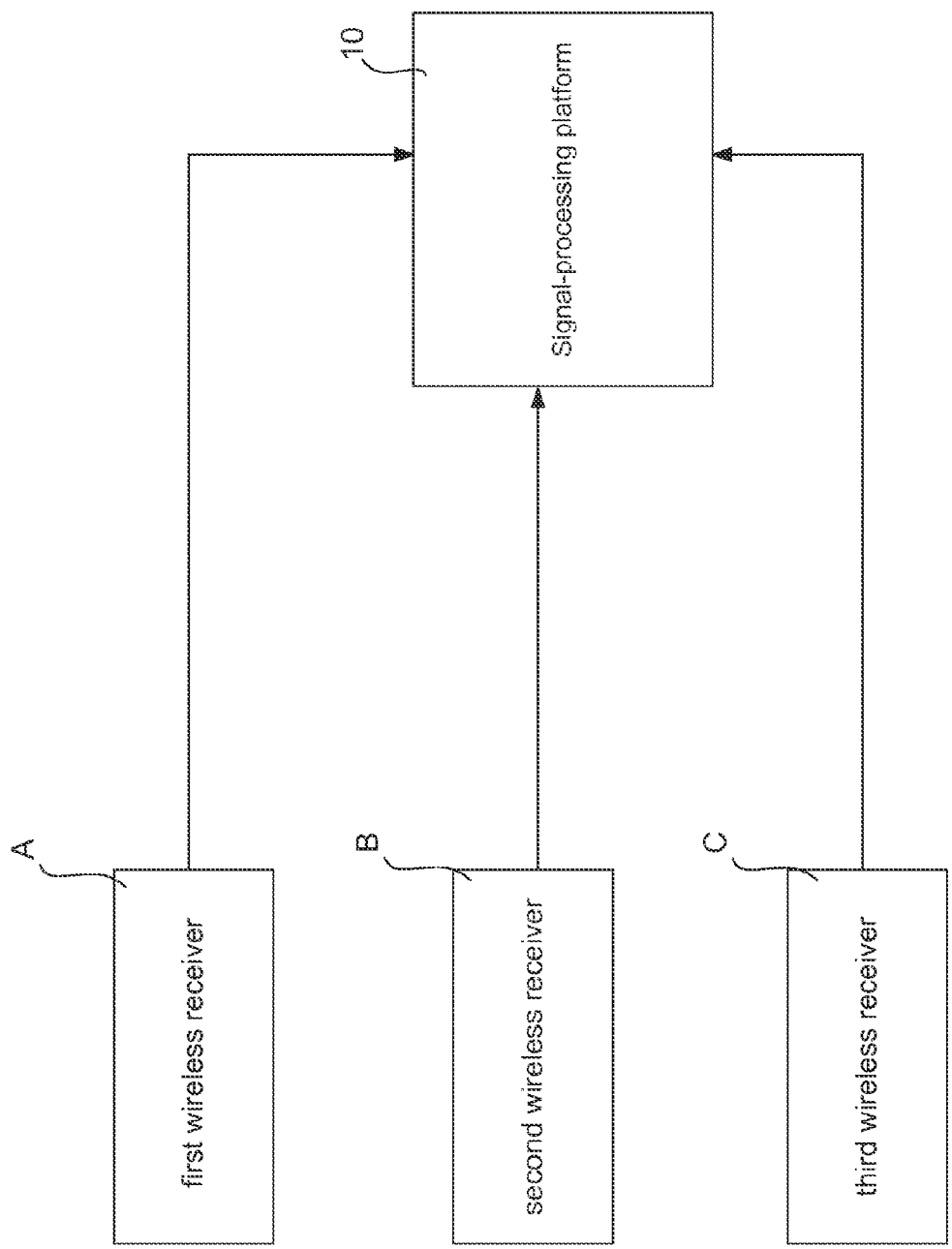
FIG. 2 is a framework view of a backend signal-processing platform of the wireless communication locating system.

With reference to FIG. 1 and FIG. 2, which illustrate a framework view of a wireless communication locating system applied with a wireless communication locating method according to the present invention and a backend signal-processing platform of the system according to the present invention. As shown in FIG. 1 and FIG. 2, the method proposed by the present invention is used for wild emergency rescue. In the framework of the system, it sets a first wireless receiver A (i.e., a first rescuer), a second wireless receiver B (i.e., a second rescuer), and a third wireless receiver C (i.e., a third rescuer) at a first position, a second position, and a third position in a free space, respectively. Wherein, terminal signal-outputting terminal U held by a person to be rescued, e.g., a cellphone, a tablet pc, a laptop, or a wireless communication device, locates in the signal receiving range of the first wireless receiver A, the second wireless receiver B and the third wireless receiver C thereof, and the first wireless receiver A, the second wireless receiver B and the third wireless receiver C are coupled to a backend signal-processing platform 10.

Figure 3:
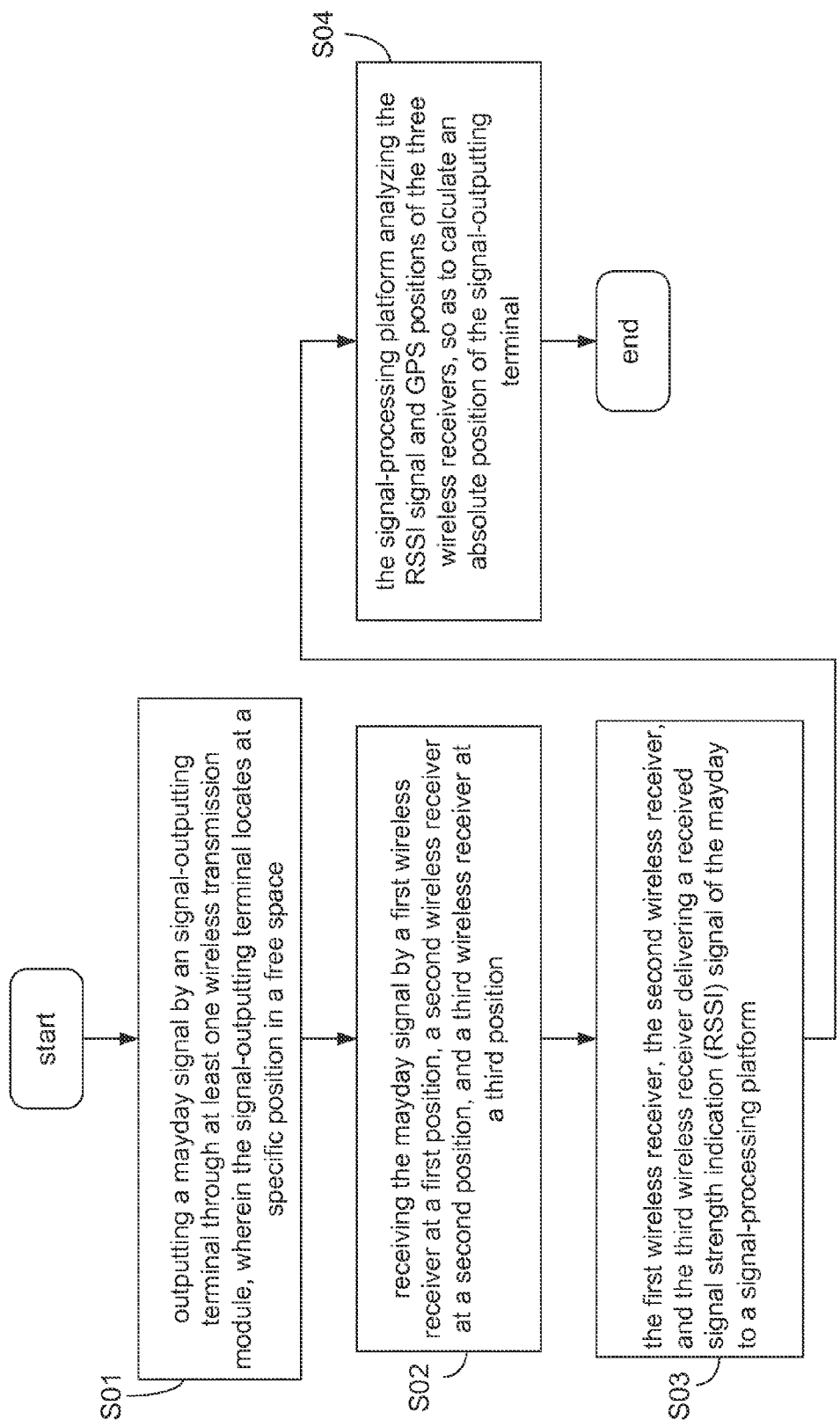
FIG. 3 is a flow charts of the wireless communication locating method according to the present invention.

Thus, through above descriptions, the basic framework of the wireless communication locating method has been introduced completely and clearly. Next, please refer to FIG. 1, FIG. 2 and FIG. 3, there is shown a flow chart of the wireless communication locating method according to the present invention. Wherein, the method shown by FIG. 3 is used for making the framework of FIG. 1 and FIG. 2 be smoothly controlled and operated. As shown in FIG. 3, the wireless communication locating method mainly consists of 4 steps:

Firstly, the method proceeds to step (S01) for outputting a mayday signal by a signal-outputting terminal U (i.e., the person to be secured) through at least one wireless transmission module, wherein the signal-outputting terminal locates at a specific position in a free space. Then, the method proceeds to step (S02) for receiving the mayday signal by a first wireless receiver A (i.e., the first securer) at a first position, a second wireless receiver B (i.e., the second securer) at a second position, and a third wireless receiver C (i.e., the third securer) at a third position. After finishing the step (S02), step (S03) is subsequently proceeded for making the first wireless receiver A, the second wireless receiver B, and the third wireless receiver C deliver a received signal strength indication (RSSI) signal of the mayday signal to a signal-processing platform 10 for signal processing and analyzing. Eventually, the method proceeds to step (S04) for making the signal-processing platform 10 process and analyze the RSSI signal and GPS positions of the three wireless receivers, so as to calculate an absolute position of the signal-outputting terminal U.

Figure 4:
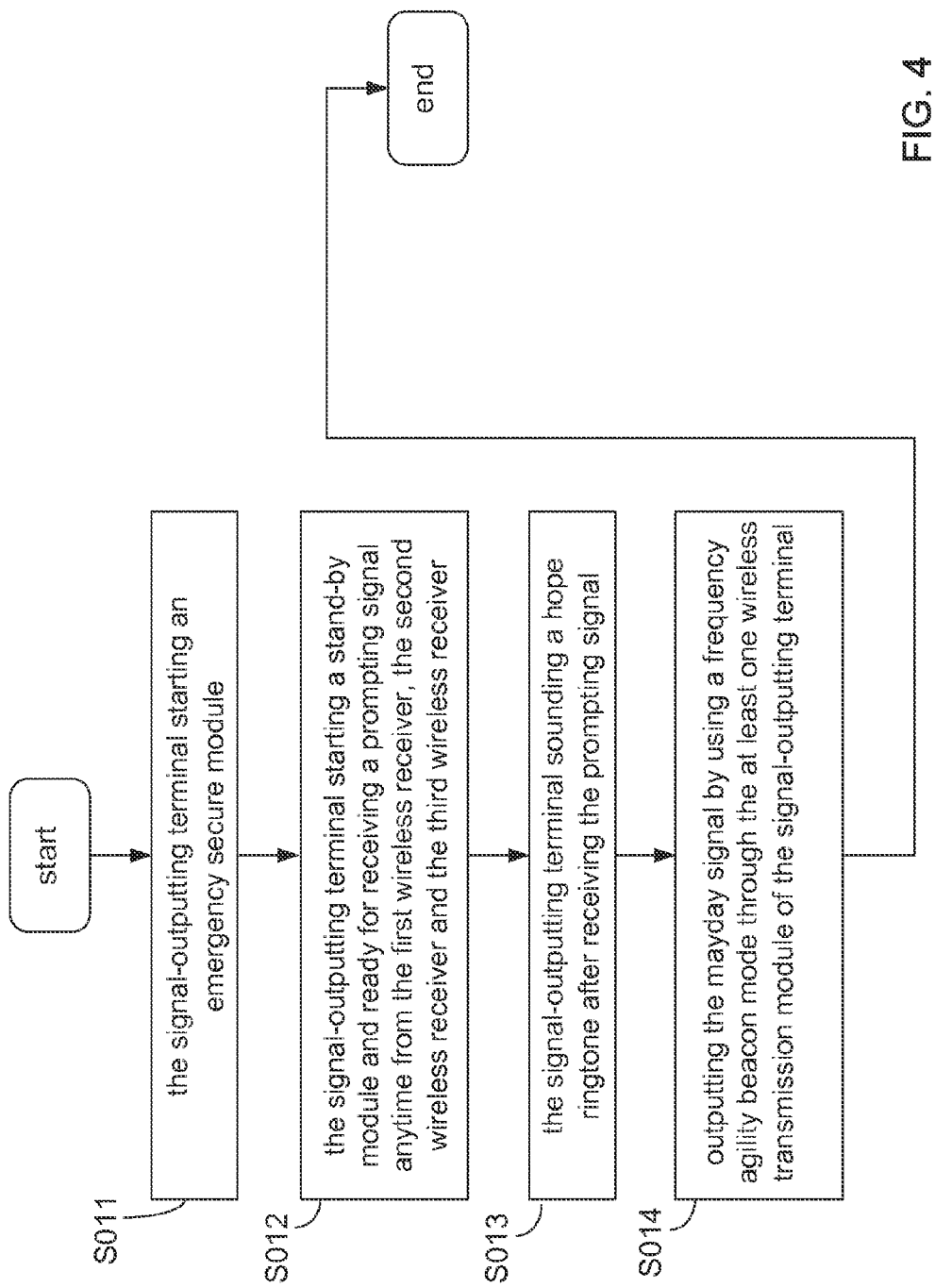
FIG. 4 is detail flow charts of step (S01)

Herein, it needs to further explain that, the wireless transmission module mentioned in aforesaid step (S01) cannot be restricted; in practical application, the wireless transmission module can be Wi-Fi wireless transmission module, Bluetooth wireless transmission module or Zigbee wireless transmission module. Furthermore, please refer to FIG. 4, there is shown step (S01)'s detail flow charts; the step (S01) further consists of 4 detailed steps:

First, the method proceeds to step (S011) and step (S012), the signal-outputting terminal U starts an emergency secure module and a stand-by module for ready to receive a prompting signal anytime from the first wireless receiver A, the second wireless receiver B and the third wireless receiver C. After step (S012) is completed, step (S013) is then executed for making the signal-outputting terminal U sound a hope ringtone after receiving the prompting signal. Finally, the detailed flow proceeds to step (S014) for outputting the mayday with frequency agility beacon mode by the signal-outputting terminal U through at least one wireless transmission module.

Figure 5:
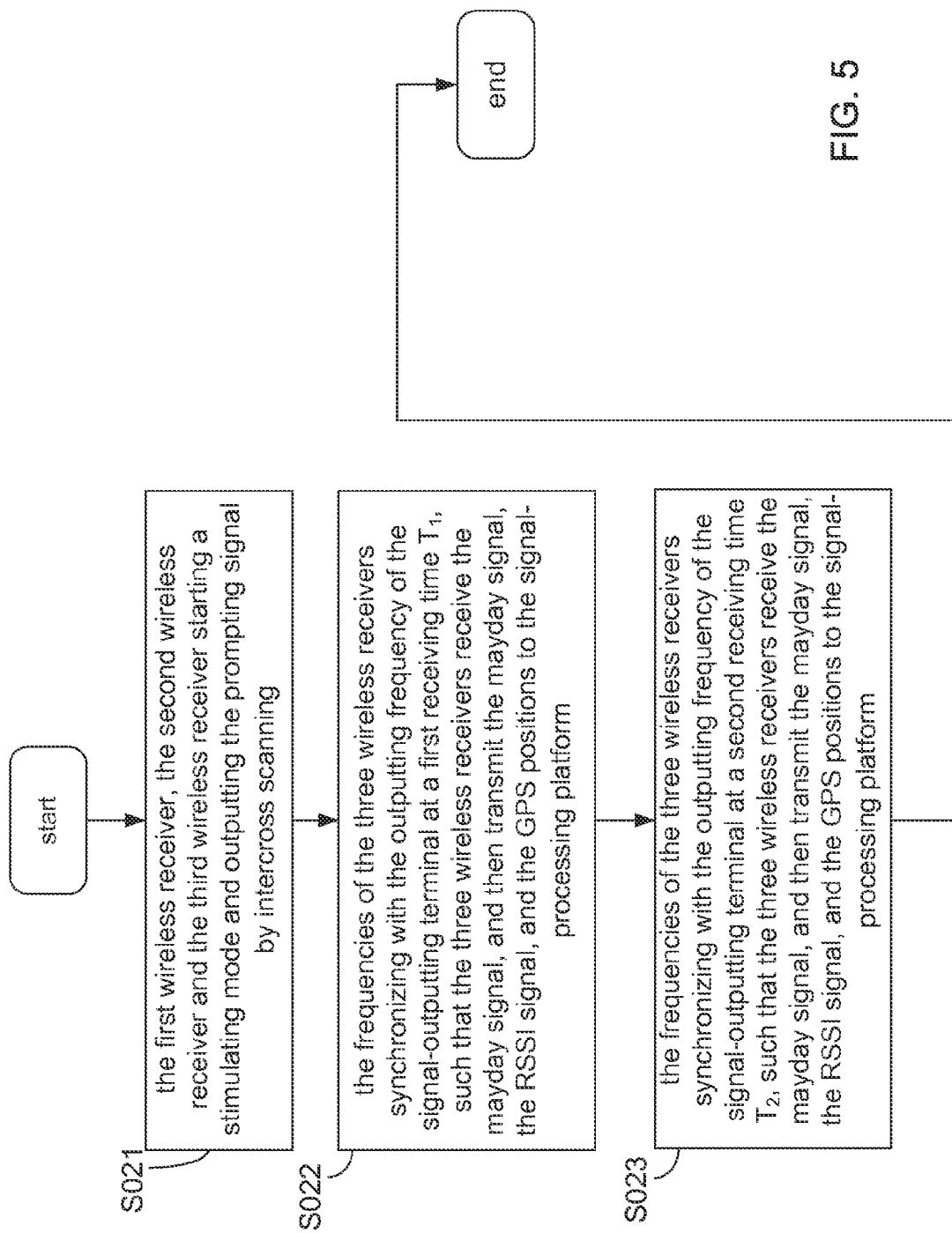
FIG. 5 is detail flow charts of step (S02)
Figure 6:
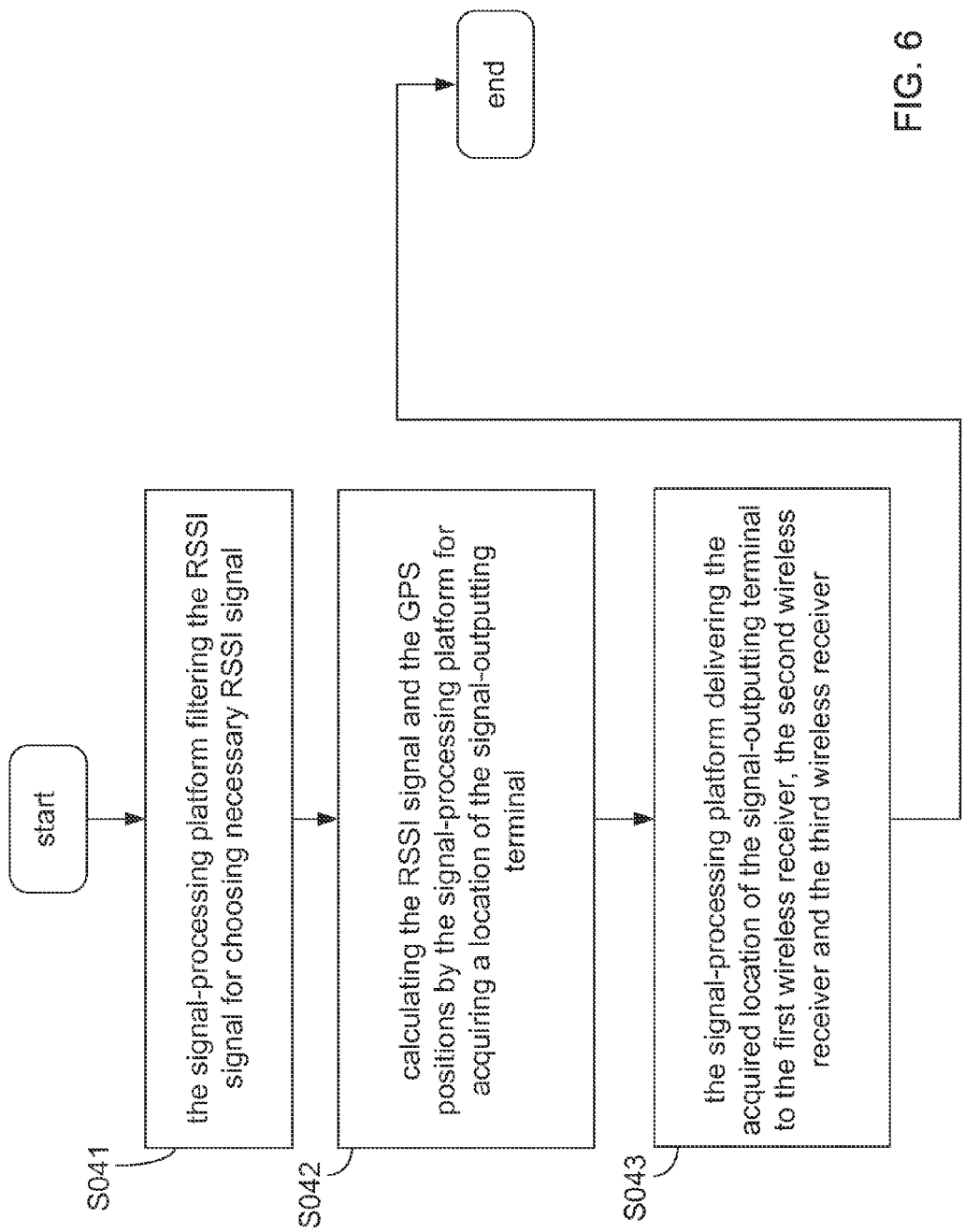
FIG. 6 is detail flow charts of step (S04)

Besides, the step (S02) is also consisted of several detailed steps. Please refer to FIG. 5, there is shown step (S02)'s detail flow chart. As shown in FIG. 5, the step (S02) consists of 3 detailed steps:

Firstly, the detailed flow proceeds to step (S021), the first wireless receiver A, the second wireless receiver B and the third wireless receiver C starting a stimulating mode and outputting the prompting signal by intercross scanning, then executes step (S022), the each three wireless receiver frequency synchronizing the signal-outputting terminal frequency at a first receiving time T1 and deleveraging the mayday, the RSSI, and the GPS position information thereof to the signal-processing platform 10. Continuously proceeds to step (S023), the each three wireless receiver frequency synchronizing the signal-outputting terminal frequency at a second receiving time T2 and deleveraging the mayday, the RSSI, and the GPS position information thereof to the signal-processing platform 10. Step (S022) and step (S023) mentioned above means that the three receiver receives the mayday from the signal-outputting terminal U at two different time (i.e., T1 and T2), wherein step (S022) and step (S023) intend to confirm the position of the signal-outputting terminal U and its' RSSI efficiently.

Figure 7A:
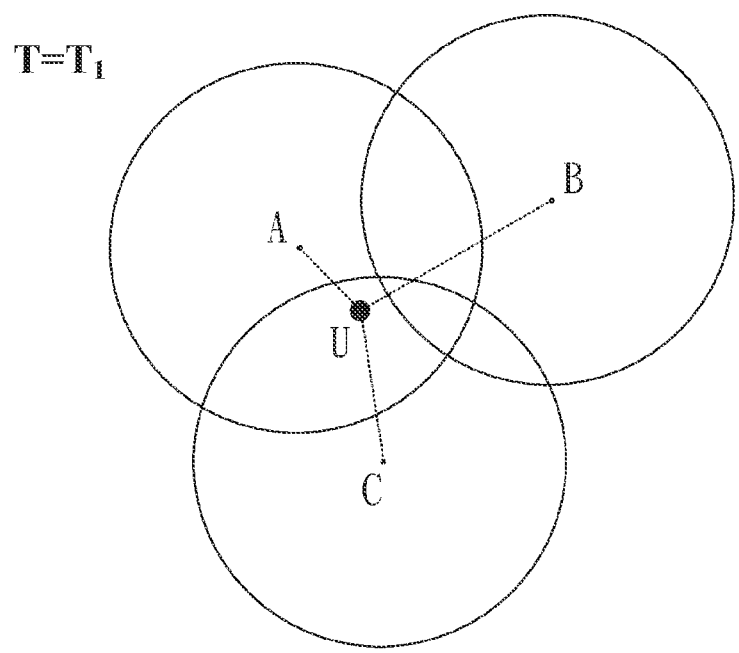
FIG. 7A is schematic position diagram of a first wireless receiver, a second wireless receiver and a third wireless receiver at first receiving timing T1.
Figure 7B:
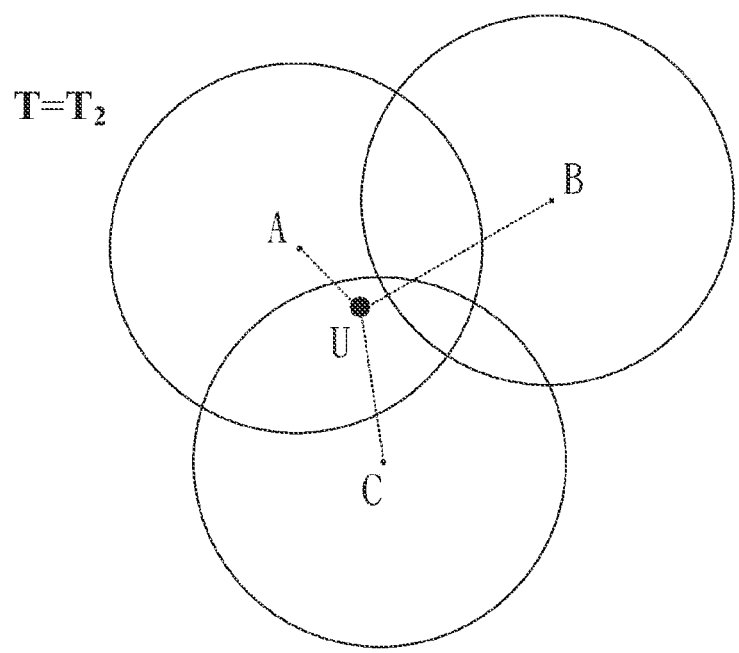
FIG. 7B is schematic position diagram of a first wireless receiver, a second wireless receiver and a third wireless receiver at first receiving timing T2.

Please simultaneously refer to FIG. 7A and FIG. 7B, there is shown schematic position diagram of the three wireless receiver at first receiving timing T1 and T2. As shown in FIG. 7A and FIG. 7B, it is possible that the GPS position of the first wireless receiver A at a first receiving time $T_1$ is the same to the GPS position thereof at a second receiving time $T_2$ in above steps (S022) and (S023); the GPS position of the second wireless receiver B at the first receiving time $T_1$ is the same to the GPS position thereof at the second receiving time $T_2$; Similarly, the GPS position of the third wireless receiver C at the first receiving time $T_1$ is the same to the GPS position thereof at the second receiving time $T_2$.

Figure 8A:
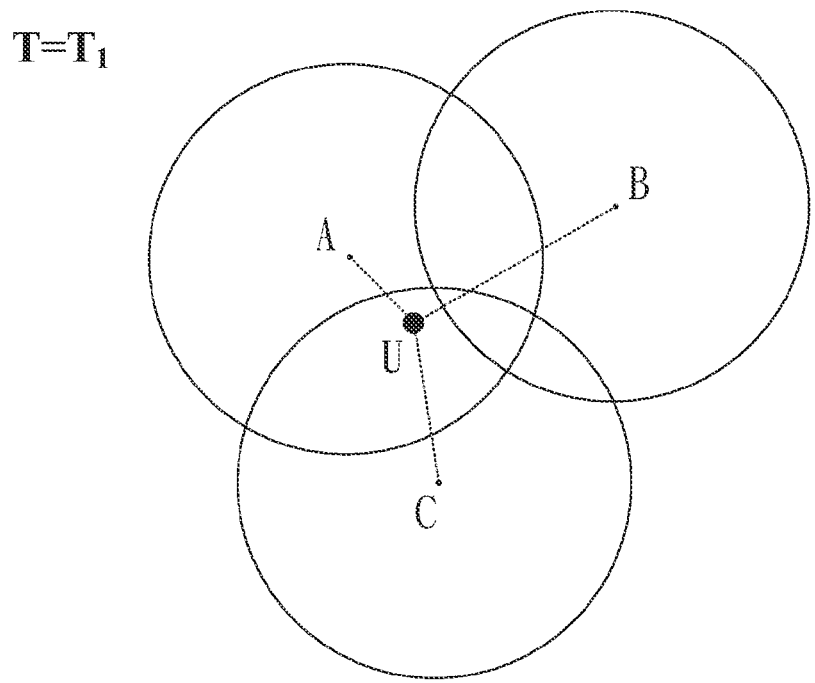
FIG. 8A is schematic position diagram of a first wireless receiver, a second wireless receiver and a third wireless receiver at first receiving timing T1.
Figure 8B:
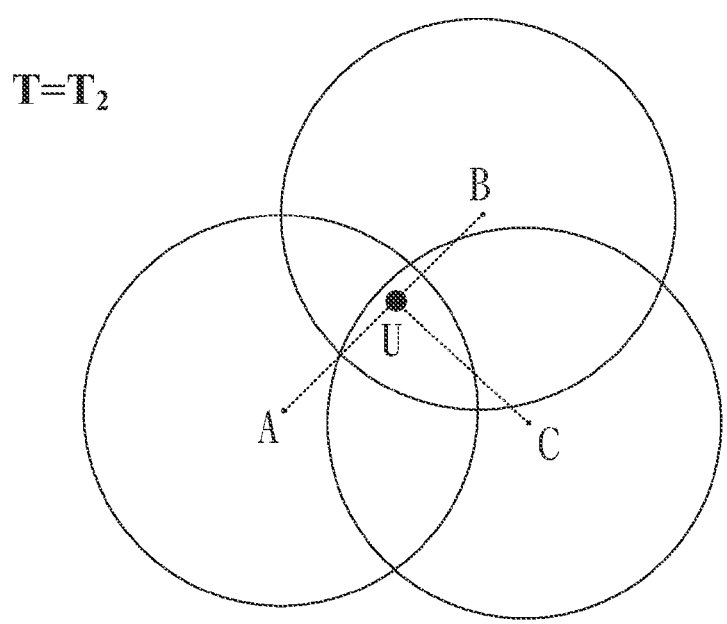
FIG. 8B is schematic position diagram of a first wireless receiver, a second wireless receiver and a third wireless receiver at first receiving timing T2.

Please oppositely refer to FIG. 8A and FIG. 8B, there is shown schematic position diagram of the three wireless receiver at first receiving timing T1 and T2. As shown in FIG. 8A and FIG. 8B, another possible condition is that the GPS positions of the first wireless receiver A, the second wireless receiver B and the third wireless receiver C at the first receiving time $T_1$ are different from the GPS positions thereof at the first receiving time T2 in step (S022) and (S023).

In order to confirm the position of the signal-outputting terminal U and its' RSSI more efficiently, step (S02) further consists following detailed steps of: proceeding to step (S024), the each three wireless receiver frequency synchronizes the signal-outputting terminal frequency at a Nth receiving timing $T_N$ and delivers the mayday signal, the RSSI, and its GPS position information to the signal-processing platform 10. The previous description means the three wireless receivers can receive the mayday signal at a third receiving time $T_3$ or at a fourth receiving time $T_4$. At the end of the method, after the backend signal-processing platform 10 received the mayday signal and the RSSI signal, the signal-processing platform 10 is able to calculate the location of the signal-outputting terminal U by analyzing the received RSSI and position the three wireless receivers.

If step (S02) includes aforesaid step (S024), it must concern the following two circumstances: Circumstance (1), the GPS position of the first wireless receiver A at the first receiving time $T_1$ is the same to the GPS position thereof at the second receiving time $T_2$ as well as the GPS position at the Nth receiving time $T_N$; the GPS position of the second wireless receiver B at the first receiving time $T_1$ is the same to the GPS position at the second receiving time $T_2$ and the Nth receiving time $T_N$; and the GPS position of the third wireless receiver C at the first receiving time $T_1$ is the same to the GPS position at the second receiving time $T_2$ and the Nth receiving time $T_N$.

Circumstance (2), all of the GPS positions of the first wireless receiver A, the second wireless receiver B and the third wireless receiver C at the first receiving time $T_1$ are different from the GPS positions at second receiving time $T_2$ and Nth receiving time TN.

Furthermore, in order to calculate the RSSI signal and the GPS position information of the signal-outputting terminal U more efficiently, step (4) further consists of below steps:

Firstly, the method executes step (S041), the signal-processing platform filters the RSSI signal for choosing the necessary RSSI, then the method subsequently proceeds to step (S042), the signal-processing platform calculates the RSSI signal and the GPS position information for acquiring a location of the signal-outputting terminal U. Finally, the method executes step (S043), the signal-processing platform 10 delivers the acquired location of the signal-outputting terminal U to the three wireless receivers.

Thus, through above descriptions, the wireless communication locating method thereof according to the present invention has been introduced completely and clearly; in summary, the present invention includes the advantages of:
1. In the present invention, the backend signal-processing platform analyzes mayday signal and RSSI signals received from a signal-outputting terminal by a first wireless receiver, a second wireless receiver, and a third wireless receiver so as to precisely locate the position of person to be rescued.
2. Inheriting to point 1, in the present invention, the signal-outputting terminal will start a stand-by module after it outputs a mayday. So that the signal-outputting terminal could avoid running out of battery energy before rescuers come.
3. Moreover, each rescuer (i.e., the first wireless receiver, the second wireless receiver, and the third wireless receiver) is able to output a prompting signal to the person to be rescued by way of frequency synchronization, so as to give the person to be rescued hopes and a message that rescuers are coming.
4. Besides, the method of the present invention includes the advantages of high damage resistance ability, high expansibility and can be easily operated because the system framework of the method is very simple, such that the purpose of immediate rescuing rescue can be achieved by using the method of the present invention in case of emergency or under precipitous circumstance.

The above description is made on embodiments of the present invention. However, the embodiments are not intended to limit scope of the present invention, and all equivalent implementations or alterations within the spirit of the present invention still fall within the scope of the present invention.

What is claimed is:
1. A wireless communication locating method, comprising:
(1) outputting a mayday signal by an signal-outputting terminal through at least one wireless transmission module, wherein the signal-outputting terminal locates at a specific position in a free space;
(2) receiving the mayday signal by a first wireless receiver at a first position, a second wireless receiver at a second position, and a third wireless receiver at a third position;
(3) the first wireless receiver, the second wireless receiver, and the third wireless receiver delivering a received signal strength indication (RSSI) signal of the mayday to a signal-processing platform; and
(4) the signal-processing platform analyzing the RSSI signal and GPS positions of the three wireless receivers, so as to calculate an absolute position of the signal-outputting terminal;
wherein the step (1) comprises below detailed steps:
(11) the signal-outputting terminal starting an emergency secure module;
(12) the signal-outputting terminal starting a stand-by module and ready for receiving a prompting signal anytime from the first wireless receiver, the second wireless receiver and the third wireless receiver;
(13) the signal-outputting terminal sounding a hope ringtone after receiving the prompting signal; and
(14) outputting the mayday signal by using a frequency agility beacon mode through the at least one wireless transmission module of the signal-outputting terminal.
2. The wireless communication locating method of claim 1, wherein the step (2) comprises below detailed steps:
(21) the first wireless receiver, the second wireless receiver and the third wireless receiver starting a stimulating mode and outputting the prompting signal by intercross scanning;
(22) the frequencies of the three wireless receivers synchronizing with the outputting frequency of the signal-outputting terminal at a first receiving time $T_1$, such that the three wireless receivers receive the mayday signal, and then transmit the mayday signal, the RSSI signal, and the GPS positions to the signal-processing platform; and
(23) the frequencies of the three wireless receivers synchronizing with the outputting frequency of the signal-outputting terminal at a second receiving time $T_2$, such that the three wireless receivers receive the mayday signal, and then transmit the mayday signal, the RSSI signal, and the GPS positions to the signal-processing platform.
3. The wireless communication locating method of claim 2, wherein the step (2) further comprises below steps:
(24) the frequencies of the three wireless receivers synchronizing with the outputting frequency of the signal-outputting terminal at an Nth receiving time $T_N$, such that the three wireless receivers receive the mayday signal, and then transmit the mayday signal, the RSSI signal, and the GPS positions to the signal-processing platform.
4. The wireless communication locating method of claim 3, wherein the GPS position of the first wireless receiver at the first receiving time $T_1$ is the same to the GPS position at the second receiving time $T_2$ and the Nth receiving time $T_N$, the GPS position of the second wireless receiver at the first receiving time $T_1$ is the same to the GPS position at the second receiving time $T_2$ and the Nth receiving time $T_N$, and the GPS position of the third wireless receiver at the first receiving time $T_1$ is the same to the GPS position at the second receiving time $T_2$ and the Nth receiving time $T_N$.
5. The wireless communication locating method of claim 3, wherein the GPS position of the first wireless receiver at the first receiving time $T_1$ is different from the GPS position at the second receiving time $T_2$ and the Nth receiving time $T_N$, the GPS position of the second wireless receiver at the first receiving time $T_1$ is different from the GPS position at the second receiving time $T_2$ and the Nth receiving time $T_N$, and the GPS position of the third wireless receiver at the first receiving time $T_1$ is different from the GPS position at the second receiving time $T_2$ and the Nth receiving time $T_N$.
6. The wireless communication locating method of claim 2, wherein the step (4) further comprises below steps:
(41) the signal-processing platform filtering the RSSI signal for choosing necessary RSSI signal;
(42) calculating the RSSI signal and the GPS positions by the signal-processing platform for acquiring a location of the signal-outputting terminal;
(43) the signal-processing platform delivering the acquired location of the signal-outputting terminal to the first wireless receiver, the second wireless receiver and the third wireless receiver.

7. The wireless communication locating method of claim 2, wherein the GPS position of the first wireless receiver at first receiving time $T_1$ is the same to the GPS position thereof at the second receiving time $T_2$, the GPS position of the second wireless receiver at the first receiving time $T_1$ is the same to the GPS position thereof at the second receiving time $T_2$, and the GPS position of the third wireless receiver at the first receiving time $T_1$ is the same to the GPS position thereof at the second receiving time $T_2$.

8. The wireless communication locating method of claim 2, wherein the GPS position of the first wireless receiver at first receiving time $T_1$ is different from the GPS position thereof at the second receiving time $T_2$, the GPS position of the second wireless receiver at the first receiving time $T_1$ is different from the GPS position thereof at the second receiving time $T_2$, and the GPS position of the third wireless receiver at the first receiving time $T_1$ is different from the GPS position thereof at the second receiving time $T_2$.

9. The wireless communication locating method of claim 1, wherein the wireless transmission module used by the wireless communication locating method is selected from the group consisting of: WIFI module, Bluetooth module and Zigebee module.

10. The wireless communication locating method of claim 1, wherein the signal-outputting terminal used by the wireless communication locating method is selected from the group consisting of: WIFI signal-outputting terminal, Bluetooth signal-outputting terminal and Zigebee signal-outputting terminal.

* * * * *